July 16, 1968 J. E. HEIDER ET AL 3,392,423
APPARATUS FOR MOLDING EXPANDABLE PLASTIC BEADS
Filed May 12, 1965 2 Sheets-Sheet 1

INVENTORS
JAMES E. HEIDER
CHARLES E. PLYMALE
BY W. A. Schaich and Charles S. Lynch
ATTORNEYS

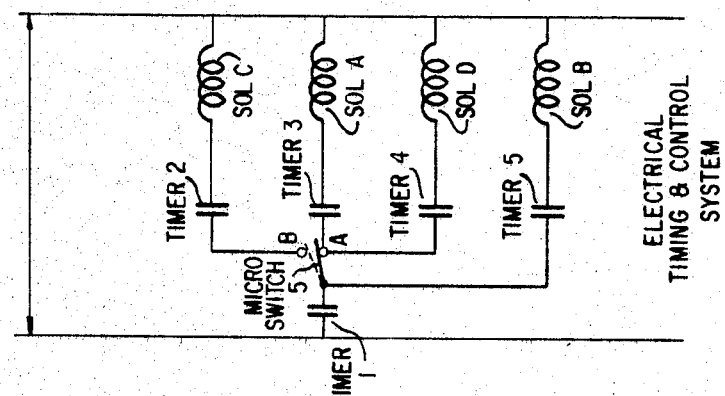
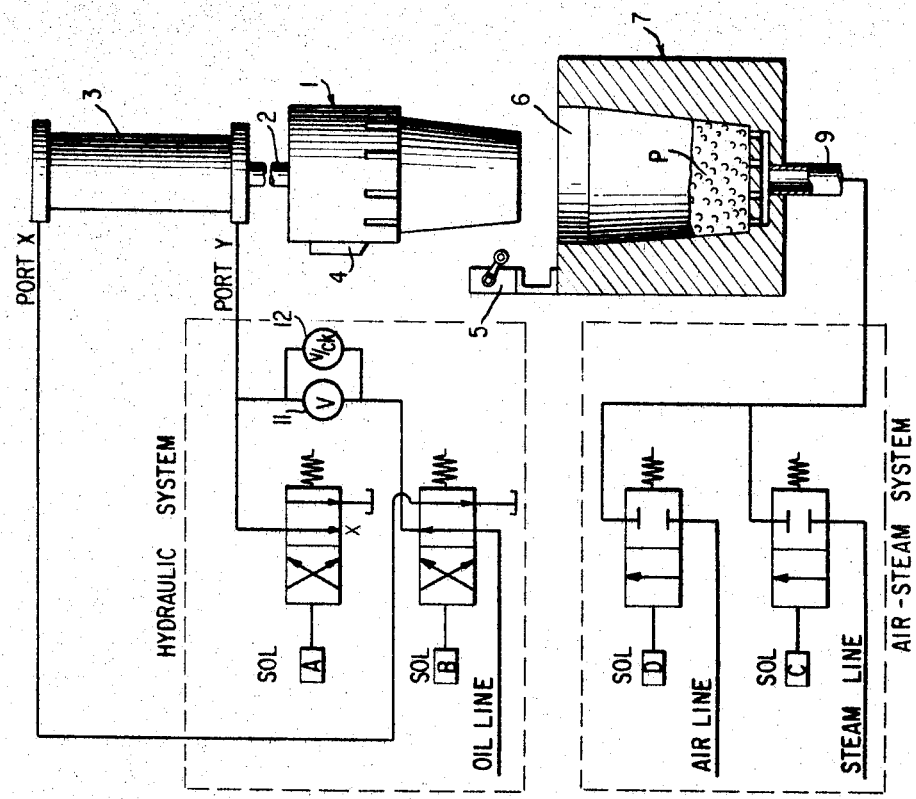

United States Patent Office 3,392,423
Patented July 16, 1968

3,392,423
APPARATUS FOR MOLDING EXPANDABLE PLASTIC BEADS
James E. Heider, Toledo, and Charles E. Plymale, Maumee, Ohio, assignors to Owens-Illinois, Inc., a corporation of Ohio
Filed May 12, 1965, Ser. No. 455,220
11 Claims. (Cl. 18—5)

ABSTRACT OF THE DISCLOSURE

An apparatus for molding foamable plastic beads wherein a female mold is first supplied with plastic beads, and then a male mold is moved into the female mold to a first closed position forming a molding cavity with the female mold. This latter position of the male mold actuates a switch to decrease the speed of the male mold and at the same time introduce steam under pressure into the molding cavity to distribute and heat the plastic beads as the male mold continues to a fully closed position. After a predetermined time interval, the supply of steam is cut off, the article is cooled and the male mold withdrawn from the female mold during which a switch actuated by the male mold initiates introduction of air under pressure into the molding cavity to eject the molded article.

---

This invention relates to an apparatus for molding articles from foamable or expandable plastic beads.

Recently, foamable or expandable plastic beads have come into widespread use for making plastic articles which are characterized by being light in weight, strong, and having good resistance to the passage of heat and water. A particularly suitable type of foamable beads is designated as "Dylite" and made by the Koppers Company, Inc., of polystyrene. These polystyrene beads contain a volatile liquid, such as pentane, as an expanding agent. However, polystyrene beads containing any volatile liquid expanding agent or containing one of the solid chemical expanding agents which decompose to yield a gaseous expanding agent on heating can be employed. Although a polymer of styrene is preferred, any thermoplastic material containing such a volatile liquid or solid chemical expanding agent giving it the capability of being foamed upon the application of heat can be used in the apparatus of this invention.

In the molding of these expandable beads, various problems have presented themselves with respect to distributing the beads within the mold cavity and thereafter heating the beads to effect fusion plus further expansion of the beads. With respect to the problem of distributing the beads, specially designed molds have been made which, during closing, will cause the beads to be uniformly distributed throughout the mold. The problem of heating the beads has been approached from several angles. In some cases, the foamable beads have been given a preliminary heating and expansion treatment. The resulting beads are then used in a molding process where they are subjected to a further heating and expansion step by introducing steam by means of coils imbedded in one or both of the coating mold members. In general, these methods are characterized by being somewhat cumbersome and requiring a longer molding cycle than is desired.

It is, therefore, an object of this invention to provide a new and improved apparatus for molding plastic from foamable beads wherein the operation of the apparatus is simplified as compared to known types of such apparatus.

Another object of this invention is to provide such an apparatus characterized by having a relatively shorter molding cycle.

A further object of this invention is to provide such an apparatus wherein during its operation a uniform distribution of the beads in the mold cavity is obtained.

Still another object of this invention is to provide such an apparatus wherein during its operation more effective heating of the beads in the mold cavity is obtained.

The foregoing and other objects are achieved by the provision of a stationary female mold half mounted axially beneath a reciprocable complementary shaped force plug. The force plug is hydraulically movable into the female mold half to a closed molding position forming a molding cavity with the female mold half. In order to distribute and expand the beads within the mold cavity, the bottom of the female mold half is connected with a source of air and steam under pressure. Control of the hydraulic system and the force plug and the introduction of air or steam into the female mold half is provided by solenoid actuated valves. The solenoid valves are in turn actuated by an electrical timing and control system energized by a sensing device which may be in the form of a micro-switch.

With a predetermined quantity of expandable plastic beads in the female mold cavity, the force plug is caused to descend rapidly toward the female mold to a first closed position when a cam on the force plug strikes the sensing device to energize the timing system. As soon as the timing control is energized, the force plug rate of travel is abruptly decreased as it approaches the second or final molding position. Upon actuation of the sensing means, steam is simultaneously introduced into the female mold half to distribute and heat the expandable beads during the first closed position. The force plug then continues to the final molding position to form the completed article. Upon completion of the molding cycle, the timing mechanism cuts off the supply of steam so as to permit cooling of the molded article. Upon subsequent withdrawal of the force plug from the female mold half air is introduced into the female mold, as the sensing device is actuated upon upward movement of the force plug, to eject the molded article from the female mold half.

The invention will be better understood by reference to the following detailed description taken in conjunction with the accompanying drawings, in which:

FIG. 5 is a schematic diagram of the air-steam and hydraulic systems employed according to the present invention; and FIG. 6 is a schematic diagram of the electrical timing and control system employed according to the present invention.

Figure 1:
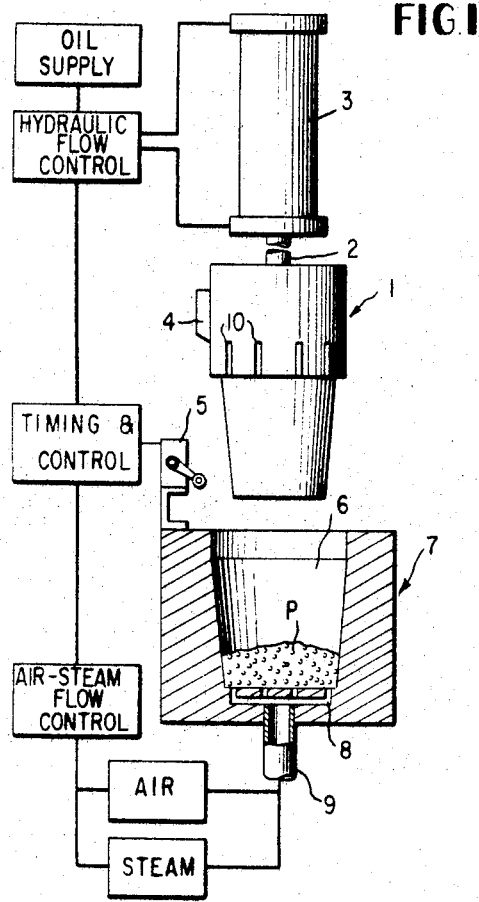
FIG. 1 is an elevation view, partly in cross-section of a molding apparatus in open position according to the present invention.

In the drawings, FIG. 1 shows a preferred embodiment of the present invention wherein male plug 1 is reciprocally actuated by piston rod 2 operating in hydraulic cylinder 3. Mounted on plug 1 is a cam 4 which contacts micro- or control switch 5 as plug 2 enters the cavity 6 of female mold 7, which contains an amount of expandable plastic beads P which will completely form the article desired. Located at the bottom of mold cavity 6 is a plurality of ports or openings 8 leading to conduit 9 which, in turn, is connected to a source of air and a source of steam.

Figure 2:
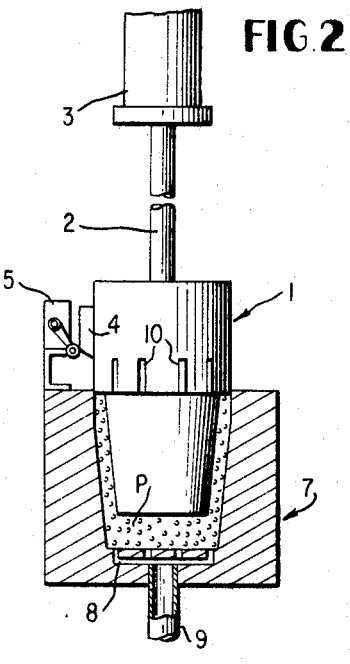
FIG. 2 is a view similar to FIG. 1 showing the molding apparatus in partly closed position.
Figure 3:
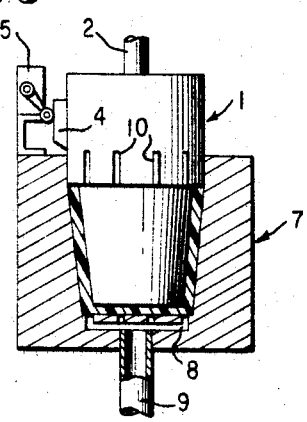
FIG. 3 is a view similar to FIG. 2 showing the molding apparatus in closed position.

In operation, a predetermined quantity of expandable plastic beads P is metered into mold cavity 6. Force plug 1 is then caused to descend rapidly until cam 4 thereon contacts control or micro-switch 5 (FIG. 2) on mold 7, whereupon solenoids in an electrical timing and control system are energized and de-energized through switch 5 and timers 2, 3, 4 and 5 (FIG. 6) to bring about a slowing down of the descent of the plug 1 through control of the rate and direction of the hydraulic fluid or oil in cylinder 3 by the timing and control system in cooperation with the hydraulic flow control as shown in FIG. 1. Simultaneously, the switch 5, acting through the timing and control system (FIG. 1) in cooperation with the air-steam flow control, initiates a series of operational steps wherein steam is introduced from a steam source by way of conduit 9 into mold cavity 6 when a concurrent distribution and heating of the beads by the steam takes place as the plug 2 descends to its closed position (FIG. 3).

Figure 4:
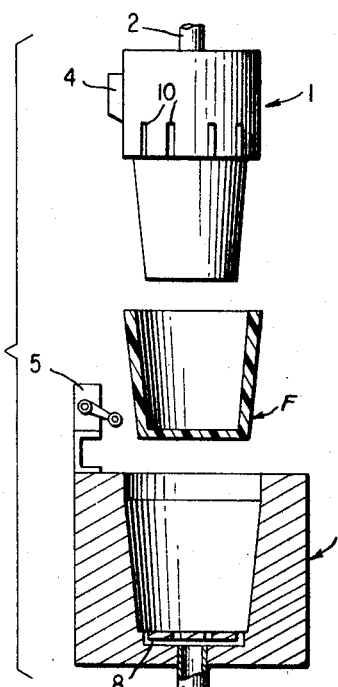
FIG. 4 is a view similar to FIG. 1 showing ejection of the finished article.

After a desired time interval which is controlled by timers in the timing and control system, the steam is then cut off and the mold with its finished article is allowed to cool for a specified period as determined by a further timer located in the timing and control system. At the end of the cooling period, solenoids are energized and de-energized in the electrical timing and control and hydraulic flow control systems, whereby hydraulic fluid is passed through cylinder 3 so as to effect a withdrawal of plug 1. As force plug 1 ascends and breaks contact with switch 5, a further timer in the timing and control system is actuated which, by way of the air-steam flow control, opens the air circuit leading to conduit 9 (FIG. 1) to effect the ejection of finished article F (FIG. 4). To facilitate the escape of gaseous products formed during the molding steps (FIGS. 2 and 3), bleed orifices 10 are provided which permit the liberation of the gaseous products to the atmosphere.

The foregoing represents a general statement of the operation of the apparatus of this invention. A more complete description of the mode of operation of the apparatus can be obtained by reference to FIGS. 5 and 6, which set forth in a schematic manner the various air-steam, hydraulic, and electrical systems involved in the molding cycle, which is shown starting with the force plug 1 in the up position. Thereafter, the contacts of timers 1, 3 and 5 are time closed, energizing solenoids A and B (FIG. 6). In this connection, all solenoid valves of FIGS. 5 and 6 are shown in the de-energized position. Energized solenoid valve B directs oil pressure to port X on the hydraulic cylinder 3. The exhaust oil from port Y is directed by energized solenoid valve A to the tank.

The contacts of timer 2 are then time closed. The force plug 1 moves down at a fast rate until cam 4, located on the force plug, engages and holds the micro-switch 5 in position B (FIG. 6). Energized solenoid valve A is de-energized by the micro-switch, and de-energized solenoid valve C is energized. The exhaust oil from port Y is directed through the flow control valve 11 to energized solenoid valve B, which directs the oil to the tank. The flow control valve 11 controls the amount of oil flow which slows the rate of descent of the force plug. Thereafter, the contacts of timer 3 are time opened. Solenoid valve C energized by micro-switch 5 directs steam into the bottom of the cavity 6. This steam blows and distributes the beads for molding and also acts as a heat carrying medium. The contacts of timer 2 are then time opened which de-energizes solenoid valve C, blocking off the steam line. The heating and cooling cycles are controlled by further timers and valves (not shown) but of the type disclosed herein.

After the article being molded is cured, the contacts of timer 5 are time opened, which de-energizes solenoid valve B. Oil pressure is then directed through de-energized solenoid valve B over the check valve 12 to port Y of the hydraulic cylinder 3. The contacts of timer 4 are then time closed. The oil pressure at port Y retracts the force plug 1. As the plug retracts, cam 4 disengages the micro-switch 5 to position A.

Since the contacts of timer 4 are closed, de-energized solenoid valve D is energized which directs air under pressure to the bottom of the cavity 6, thereby ejecting the finished molding. The contacts of timer 4 are then time opened which de-energizes solenoid valve D. Thereafter, the contacts of timer 1 are time opened and at this point the cycle is completed. It will be noted in FIGS. 5 and 6 that solenoids A, B, C and D are shown in both figures so as to bring out the relationship between the hydraulic and air-steam systems of FIG. 5 to the system of FIG. 6.

From the foregoing description it will be apparent that there has been provided a switch mechanism which actuates not only a hydraulic system controlling the descent and ascent of plug 1, but also an air and steam system in connection with mold 7 whereby heating of the mold and ejection of articles from the mold are controlled in timed operative sequence through an electrical timing and control system consisting of a plurality of solenoids and timers. The timers and solenoids employed are conventional and no invention is claimed with respect to these elements per se. With the present apparatus, it is possible to effect a controlled distribution and direct heating (in contrast to contact heating wherein steam coils are positioned in either the male plug or female die) of the plastic beads during the time that the force plug 1 moves from a partly closed position (FIG. 2) to a completel closed position (FIG. 3, thereby insuring the formation of molded articles which are of uniform density and which have been thoroughly heated.

The apparatus or control system of the present invention is particularly adaptable to the molding apparatus disclosed in U.S. Patents Nos. 3,013,304, 3,013,306 and 3,111,710.

With regard to the expandable plastic beads to be employed in the present invention, polystyrene beads designated as "Dylite" and referred to above have proven particularly suitable. These beads can be given a pre-expansion treatment by heating them at 180–240° F., very often in the presence of live steam, until a density of 1–5 lbs. per cubic foot is obtained. However, polystyrene beads having a density up to about 15 lbs. per cubic foot can be employed in the method and apparatus of this invention. Although satisfactory articles have been made with the present apparatus with a complete molding cycle of 20 seconds, it will be apparent that this will vary with the size and wall thickness of the article being molded.

While we have described and illustrated a preferred embodiment of our invention, we wish it to be understood that we do not intend to be restricted solely thereto, but that we do intend to cover all modifications thereof which would be appaaent to one skilled in the art and which come within the spirit and scope of our invention.

We claim:

1. In an apparatus for molding an article from expandable plastic beads comprising a male mold member and a female mold member having a cavity complementary to the male mold member, the improvement comprising means to provide relative movement between the two mold members from an open position to a first closed position and then toward each other further to a second closed position, a steam-introducing means connected to one of said mold members, means to change the rate of operation of said means providing relative movement whereby the relative movement of said mold members is slower from about the first closed position to the second closed position than the rate of relative movement from the open position to about the first closed position, means to initiate operation of said steam-introducing means, and means responsive to one of said mold members in the relative movement reaching about the first closed position, said responsive means initiating operation in a predetermined manner said means to initiate operation of said steam-introducing means and said means to change the rate of operation of the relative movement means.

2. The apparatus of claim 1 wherein said responsive means initiates a simultaneous operation of said means to initiate operation of said steam-introducing means and said means to change the rate of operation of the relative movement means.

3. In an apparatus for molding an article from expandable plastic beads comprising a male mold member and a female mold member having a cavity complementary to the male mold member, the improvement comprising means to provide relative movement between the two mold members from an open position to a first closed position and then toward each other further to a second closed position, a steam-introducing means connected to said female mold member, means to change the rate of operation of said means providing relative movement whereby the relative movement of said mold members is slower from about the first closed position to the second closed position than the rate of relative movement from the open position to about the first closed position, means to initiate operation of said steam-introducing means, and means responsive to one of said mold members in the relative movement reaching about the first closed position, said responsive means initiating operation in a predetermined manner said means to initiate operation of said steam-introducing means and said means to change the rate of operation of the relative movement means.

4. In an apparatus for molding an article from expandable plastic beads comprising a male mold member and a female mold member having a cavity complementary to the male mold member, the improvement comprising means to provide relative movement between the two mold members from an open position to a first closed position and then toward each other further to a second closed position, a steam-introducing means connected to one of said mold members, an air introducing means connected to one of said mold members, means to change the rate of operation of said means providing relative movement whereby the relative movement of said mold members is slower from about the first closed position to the second closed position than the rate of relative movement from the open position to about the first closed position, means to initiate operation of said steam-introducing means, means to initiate operation of said air-introducing means, and means responsive to one of said mold members in the relative movement reaching about the first closed position, said responsive means initiating operation in a predetermined manner (a) said means to initiate operation of said steam-introducing means, (b) said means to change the rate of operation of the relative movement means, and (c) said means to initiate operation of said air-introducing means upon completion of the molding operation and subsequent opening of the mold apparatus.

5. In an apparatus for molding an article from expandable plastic beads comprising a male mold member and a female mold member having a cavity complementary to the male mold member, the improvement comprising means to provide relative movement between the two mold members from an open position to a first closed position and then toward each other further to a second closed position, a steam-introducing means connected to said female mold member, an air-introducing means connected to said female mold member, means to change the rate of operation of said means providing relative movement whereby the relative movement of said mold members is slower from about the first closed position to the second closed position than the rate of relative movement from the open position to about the first closed position, means to initiate operation of said steam-introducing means, and means responsive to one of said mold members in the relative movement reaching about the first closed position, said responsive means initiating operation in a predetermined manner (a) said means to initiate operation of said steam-introducing means, (b) said means to change the rate of operation of the relative movement means, and (c) said means to initiate operation of said air-introducing means upon completion of the molding operation and subsequent opening of the mold apparatus.

6. In an apparatus for molding an article from expandable plastic beads comprising a male mold member and a female mold member having a cavity complementary to the male mold member, the improvement comprising means to provide relative movement between the two mold members from an open position to a first closed position and then toward each other further to a second closed position, a steam-introducing means connected to one of said mold members, first control means responsive to one of said mold members in the relative movement reaching about the first closed position to initiate operation of said steam-introducing means, air introducing means for introducing air under pressure into the mold cavity for ejecting a molded article therefrom, and second control means responsive to separation of the male and female mold members for initiating operation of said air introducing means for purposes of ejecting a molded article.

7. Apparatus defined in claim 6 wherein said first and second control means include a common switch engageable by one of the mold members during its movement relative to the other mold member.

8. In apparatus for molding an article from expandable plastic beads comprising a male mold member, a female mold member having a cavity complementary to the male mold member for receiving plastic beads to be molded, means for moving the mold members relative to each other between a separated position, a first closed position and a second further closed position, and means for heating the beads; the improvement comprising in combination, first fluid introducing means for introducing fluid into the mold cavity to distribute the plastic beads prior to movement of the mold members to the second closed position, means for reducing the speed of relative movement of the mold members during movement from the first closed position to the second closed position thereof, and first control means responsive to the mold members reaching the first closed position for energizing said means for reducing the speed of the mold members during movement towards their second closed position and for initiating operation of said means for introducing fluid into the mold cavity for distributing the plastic beads.

9. Apparatus defined in claim 8 further including second fluid introducing means for introducing a fluid into the cavity after the formed article is cooled to eject the formed article from the cavity.

10. Apparatus defined in claim 9 further including second control means for initiating the operation of said second fluid introducing means for ejecting the formed article, said second control means being operable in response to relative movement of said mold members towards their separated position.

11. Apparatus defined in claim 10 further including control means for automatically operating the mold members between their separated and first and second closed positions, said last recited control means including a timer for initiating movement of said mold members to their separated position after the article has cooled, and wherein there is further provided another timer for de-energizing said first fluid introducing means.

References Cited

UNITED STATES PATENTS

| 2,054,476 | 9/1936 | Derry et al. | 18—17 |
| 2,389,319 | 11/1945 | McMordie et al. | 18—24 |
| 3,111,710 | 11/1963 | Plymale | 264—51 X |
| 3,178,491 | 4/1965 | Dart | 264—53 |

WILBUR L. McBAY, *Primary Examiner.*